(12) United States Patent
Rossman et al.

(10) Patent No.: US 8,963,718 B2
(45) Date of Patent: Feb. 24, 2015

(54) RFID CHIP AND ANTENNA

(71) Applicant: RadioFIDO, LLC, Peterborough, NH (US)

(72) Inventors: Court E. Rossman, Merrimack, NC (US); Zane Lo, Merrimack, NH (US); Ronald A. Gilbert, Milford, NH (US); John A. Windyka, Amherst, NH (US)

(73) Assignee: RadioFIDO LLC, Peterborough, NH (US)

( * ) Notice: Subject to any disclaimer, the term of this patent is extended or adjusted under 35 U.S.C. 154(b) by 0 days.

(21) Appl. No.: 13/869,890

(22) Filed: Apr. 24, 2013

(65) Prior Publication Data

US 2014/0001271 A1    Jan. 2, 2014

Related U.S. Application Data

(63) Continuation of application No. 13/025,199, filed on Feb. 11, 2011, now abandoned, and a continuation of application No. 11/918,696, filed as application No. PCT/US2006/033048 on Aug. 24, 2006, now Pat. No. 7,911,343.

(60) Provisional application No. 60/711,218, filed on Aug. 25, 2005.

(51) Int. Cl.
  *G08B 13/14*    (2006.01)
  *G06K 19/077*   (2006.01)

(52) U.S. Cl.
  CPC .... *G06K 19/07786* (2013.01); *G06K 19/07756* (2013.01)
  USPC .................. 340/572.1; 340/572.4; 340/572.8; 340/10.1; 340/10.3; 235/382; 235/383; 235/385; 235/492

(58) Field of Classification Search
  CPC ................................................. G06K 19/07749
  USPC .............. 340/572.1, 572.7, 572.8, 10.1, 10.3; 235/382, 383, 385, 492
  See application file for complete search history.

(56) References Cited

U.S. PATENT DOCUMENTS

| | | | |
|---|---|---|---|
| 7,055,754 B2 * | 6/2006 | Forster | 235/492 |
| 7,564,356 B1 * | 7/2009 | Youn | 340/572.1 |
| 2002/0125566 A1 * | 9/2002 | Tonami et al. | 257/728 |

* cited by examiner

Primary Examiner — Tai T Nguyen
(74) Attorney, Agent, or Firm — NKK Patent Law, PLLC

(57) ABSTRACT

A Radio Frequency Identification (RFID) device antenna has a feed region of interdigitated fingers. The interdigitated fingers have parallel centerlines and are spaced one from another. A chip having opposing ends overlays opposing interdigitated fingers. A coupling is established between the chip and the antenna at the interdigitated fingers.

16 Claims, 11 Drawing Sheets

RFID CHIP AND ANTENNA

RELATED APPLICATIONS

This application is a continuation application of U.S. application Ser. No. 13/025,199 filed Feb. 11, 2011, which is a divisional application of U.S. application Ser. No. 11/918, 696, filed Oct. 17, 2007. This application and each aforementioned application claim priority rights under 35 USC §119(e) from U.S. Application Ser. No. 60/711,218 filed Aug. 25, 2005, the contents of which, and the contents of each aforementioned application, are incorporated herein by reference.

FIELD OF THE INVENTION

This invention relates to the use of Radio Frequency Identification (RFID) tags for tracking items during shipping, receiving the items at final destination and inventory control of items, and more specifically to methods for mounting the RFID chip onto a larger antenna.

BACKGROUND OF THE INVENTION

RFID tags have been utilized extensively to be able to trace pallets from a point of shipment through a destination, with the RFID tags being passive devices that are read out with RF energy, usually in the 900 MHz range. These passive devices are parasitically powered by the energy impinging upon the antenna of the tag that powers the integrated circuits within the tag, with the result that the tag transmits the identity of the pallet in response to a probing signal.

While such RFID tags are now mandated for pallets in some industries, there is increased level of interest in item-level tagging, which involves placing a tag on the item itself as opposed to on a pallet of items.

However, in order to be able to make such tagging strategies possible for low-value items such as toothpaste and the like, techniques are required to be able to manufacture and deposit the tags on items at an overall cost of no more than 5 cents per item.

The relatively low price for the tagging of items is not so important in high-value items such as pharmaceuticals, where the tag price may be as much as 25 or 50 cents from start to finish. Rather, mass merchants are interested in keeping track of how much material is on their shelves for inventory control.

This means that, for short ranges, an individual carries a reader with him- or herself and probes the individual items, either in a walk-by scenario or as the items come into the facility, for instance on a conveyor belt.

Note that RFID technology is not merely a bar code technology, but rather one that can store data and, upon request from a reader, output data to a global database. The data can be as simple as a product ID code.

The desideratum using item-level RFID tags is that the whole shipment history of a product from the time it leaves the manufacturing plant to its final destination can be tracked through various hands such as shippers, importers, wholesalers and warehousemen.

If in its simplest embodiment the RFID tag merely contains an identification number, this number is read out along the way during shipment such that the transport history of the item can be ascertained.

It is noted that the current tags are passive tags in that they do not require or have a battery. This is useful because in item-level tagging there is no real estate available for batteries and battery shelf life is not a problem.

With respect to tagging of a pallet, it is noted that a pallet is usually placed on a forklift truck and is driven, for instance, into a warehouse where it passes through the warehouse door at which a reader is located. The reader sends out RF energy that charges up the passive tag by transferring energy to the integrated circuits within the tag. The reader then transmits a special code that interrogates the RFID electronics so as to output the tag ID and any other related information stored by the tag.

These passive devices have a range of approximately 30 feet, given the fact that the Federal Communications Commission limits the amount of radiated power from the reader to be 1 watt.

As to the size of the tags that are currently placed on pallets, they are on the order of 2 inches by 2 inches, with the antenna dimensions being the dominating factor. It is noted that the larger the antenna, the greater the range, since a larger tag antenna can capture more energy from a reader. For short-range applications such as monitoring pill bottle inventories, the antenna can be indeed quite small.

Note that with small antennas the amount of energy available for the integrated circuits making up the tag is limited, with the energy being derived from a so-called rectenna that rectifies the RF energy and stores it on a capacitor. In these cases the energy from the capacitor is utilized to power up the circuitry that includes some kind of logic or even a microcomputer as well as a transmitter. Note that once the circuit is powered up the information is transmitted back to the reader.

Using the above tags to identify pallets is commonplace. However, the integrated circuits are relatively expensive, with the integrated circuit tending to be the most expensive part. Secondary to the expense of the integrated circuit itself is the cost involved in building the tag.

If pallets, for instance, are high value, one can afford a 50- or 75-cent tag. However, for item level tags the cost needs to be kept under 5 cents.

Moreover, for item-level tags, the output of the transmitter of the RFID tag is in general in the microwatt range due to the small size antenna required. However, with sufficient size reduction there should be a concomitant cost reduction at least of the integrated circuits. If one could make the integrated circuits very, very small, in the micron or tens of micron size, the cost per IC die goes down dramatically. This is because if one can utilize large wafers, one can make millions of individual dies per wafer. With processing costs constant and sufficient yields, one can reduce the cost of the tag under 5 cents.

For item-level tags, for instance on individual pill containers, one can arrange to have antennas that are perhaps a quarter of an inch on a side, with a tiny integrated circuit on them. However, even if one could make the micron-sized RFID tags, one is faced with a significant challenge in how to locate an RFID integrated circuit on the associated antenna at its feed point.

In an effort to reduce the cost of the individual chips, manufacturing large numbers of them on a large-size wafer while theoretically reducing the cost f these chips, the individual chips are extremely hard to test and hard to handle. What is conventionally done now, at least for item-level RFID tags, is to use pick-and-place machines and size the individual integrated circuits to be at least large enough to enable the pick-and-place operation. Thus, the integrated circuits must be of a size that they can be taken off some kind of dispensing apparatus and physically moved where they can be deposited on and electrically connected to the antenna.

However, pick-and-place machines currently are limited to integrated circuits that are larger than a millimeter on a side.

If one could break through the barrier imposed by pick-and-place machines, for instance utilizing different deposition techniques, then one could garner the cost savings of manufacturing millions of integrated circuits on a single wafer. It would therefore be extremely useful in reducing the overall price of the RFID tag to be able to have integrated circuits as small as a $10^{th}$ of a millimeter on a side. Manufacturing of such small integrated circuits is possible with standard 90-nanometer integrated circuit technology. Even 65-nanometer technology in high volume applications is now state of the art.

However, just because one can lay down patterns that have 90-nanometer line widths or less, a serious limitation is the ability to be able to scribe and break the individual ICs apart from the die. Note that various scribing, breaking, and sawing techniques have been used in the past to separate out individual integrated circuits.

Taking sawing for instance, the saw itself defines the curf, which is the material that the saw blade requires in the removal of material. Note that in most cases the curf is larger than the desired size of the chips.

As to laser scribing, one can go to finer and finer pitches, but one has thermal issues that limit this type of scribing technique.

There is, however, a unique chemical etching process that limits undercutting in which microscopic dies can be formed utilizing standard CMOS processes.

Assuming that one can actually separate out the microscopic dies, as illustrated in U.S. Pat. No. 6,864,570 and licensed to Alien Technology, mounting of the dies to an antenna can be accomplished through the use of a shaped die and a specially shaped receiver cavity. In a self-assembly method, these shaped dies are squeegeed over in a slurry across a substrate that has receiver cavities that are adapted to uniquely hold the specially-shaped dies.

This type of self-assembly method requires a match between the orientation of the die and the receptacle. Thus the specially shaped ICs have to match the corresponding cavities and if they are randomly oriented in the slurry, they will either not enter the cavity or not be appropriately positioned in the cavity.

The result is that the reliability of the RFID tags when manufactured in this and other processes oftentimes results in failure rates of 5 to 10% that are wholly unacceptable. In order to eliminate those RFID tags that are inoperative, one must test the tag before applying it to a package, which is another time-consuming and costly procedure that may not be totally successful when microscopic integrated circuit-type tags are involved.

What is therefore needed is first a manufacturing technique for manufacturing RFID tags that reduces the cost of the individual integrated circuit by reducing the size of the integrated circuits; and secondly a technique for coupling the integrated circuits to the feed points of antennas in a way that virtually guarantees a 100% yield while at the same time eliminating the use of pick-and-place machines.

Of particular importance in the provision of RFID tags are techniques to connect microradio size integrated circuits to corresponding antennas so that the circuits can be parasitically powered, programmed, probed and read out. While a co-pending application describes one method for coupling RFID circuits to an antenna at its feed point, there is a requirement for more efficient manufacturing methods and to obtain maximum gain and maximum output for the tag.

SUMMARY OF INVENTION

According to the present invention, there are various methods for coupling an RFID chip to an antenna. One, direct dc contact between the chip and the antenna, using a grid of interdigitated fingers at the feed region. Two, a single gap is used at the feed region, and the chip is approximately positioned but then centered and aligned across the gap using magnetic/electric techniques. Three, field coupling is achieved (without DC contacts) when the chip contains a small antenna, and this assembly is then positioned at the appropriate region of the main antenna, preferably a narrowed region that concentrates magnetic fields surrounding the chip. An intermediate loop can be used for stronger coupling. Also, field coupling can be achieved using capacitive pads, which overlay the feed region of the antenna.

The first method uses an interdigitated antenna feed that presents a large number of positions for a randomly oriented microradio to connect to, thus increasing the likelihood of a good connection across an antenna feed point gap. In one embodiment the microradio is provided with dual-sided or 3D bonding pads, integrated onto the RFID chip (as opposed to 2D pads) to allow placement of the chip on the antenna and connection to its feed point regardless of orientation and position of the microradio chip. Note, the chip is made for direct connection to the feed region of, for example, a spiral, dipole, or loop antenna. For quick and inexpensive placement of the chip, the chip can be carried in a slurry that is deposited over the interdigitated gap for the antenna feed, where the gap is made the same size as the length of the chip, i.e., separation between the two pads on the chip. Chip and interfinger dimensions can be made quite small to permit the IC cost savings associated with microradio chips. This placement method is probabilistic in that there is a high probability that one microradio will be properly connected across at least one gap in the interdigitized antenna feed due to its many tines and its interdigitated design.

When the interdigitated structure is formed utilizing conductive ink, the resistivity of the ink can sometimes cause problems. In order to increase the conductivity and decrease the resistance, after a microradio is deposited across the tines of the interdigitated structure, a conductive adhesive and/or solder can be deposited over the tines to either side of the tines across which the microradio is connected. This substantially increases the line width of the tines to eliminate the above-mentioned problems with the resistivity of the conductive ink.

To determine correct placement and orientation of the RFID chip onto the antenna, the RFID response can be tested using the standard RFID functionality. For single chip placements, if there is an incorrect placement, another chip is added until success is achieved. For multiple chips in a slurry, there is a high likelihood that at least one chip will be properly placed across adjacent feed point fingers.

For electrical contact, the pads or the antenna may have electrically conductive adhesive applied. Additional methods are disclosed in the referenced patent entitled "RFID Tag and Method and Apparatus for Manufacturing Same."

What has been described above is the utilization of the interdigitated antenna feed structure to provide numbers of contacts for randomly oriented microradios however they are deposited on or positioned on the antenna feed.

In order to make sure that the microradios are properly positioned transverse to the longitudinal center line of the tines of the interdigitalized feed, it is possible to orient the microradios as they are deposited through a self-aligning procedure, which is either electrostatic in which the microradio is provided with charges on either end that are opposite and an external field is applied or voltages are applied to the alternating tines of the interdigitated structure so that with like charges repelling and unlike charges attracting, the microradios, when they arrive in the vicinity of the tines of the interdigitated structure, will align themselves up in a preferred transverse direction to the longitudinal axis of the tines.

The microradios themselves can be polarized before being deposited in the vicinity of the feed structure, or they can be electrostatically charged by applying a differential voltage to adjacent tines, with the result being the same and that being that the microradios with the spaced charge structure will line up due to electrostatic attraction and repulsion. Moreover, an E-field may be utilized external of the interdigitated structure to align the microradios.

In an alternative embodiment, the microradio may be provided with a ferromagnetic material that in essence embeds a permanent magnet in the microradio. The alignment procedure is by providing a permanent magnet to either side of the interdigitated structure such that when the microradios are deposited in the vicinity of the interdigitated structure, they are magnetically aligned.

One of the ways that the microradios are deposited is by embedding the microradios in a nonconductive fluid and inkjetting or depositing the fluid in the vicinity of the interdigitated structure. Another way, akin to xerography, is to for instance imprint or provide a metallized antenna on an item to be tagged and then to image that antenna onto a photoconductive material, which results in a pattern on the photoconductive material that corresponds to the image of the metallized antenna on the item.

With the image on the photoconductive material, multiple microradios are deposited on top of the image and stick to the pattern, where the image is not discharged. It is noted that the image is discharged when light impinges on the photoconductive material, with the dark areas of the imaged metallized antenna not discharging the photoconductive material.

The result is the photoconductive material having a pattern of microradios corresponding to the pattern of the antenna feed point, which may be the interdigitated structure noted above.

When the photoconductive material is aligned with and pressed against the metallized antenna on the item, the microradios will be aligned with and adhere to the proper feed points on the antenna.

Alternatively, instead of imaging a previous interdigitated metallized feed region of the antenna, an alternative would be to leave the feed region on the antenna un-metallized and let the stamping process from the photoconductor simultaneously define the interdigitated tines and also apply the RFID chip. This would avoid precise mechanical orientation issues.

It will be appreciated that this type of photoconductive process is an alternative to the aforementioned inkjet printing system previously described.

This general technique to mount the RFID chip can apply to any case where a chip must be mounted onto an antenna. For example, the antenna can be ink jetted onto the consumer item, and the chip applied directly to the consumer item. Alternatively, the antenna can be separately made on an adhesive plastic, and the chip mounted onto this antenna. The antenna and chip structure are then applied to the consumer item.

In summary, an interdigitated structure is provided as a feed point to an antenna on an RFID tag, with microradios deposited over the interdigitated structure such that at least one of the microradios is either directly connected to the interdigitated structure in the appropriate orientation or in which the orientation of the deposited microradios can be aligned utilizing electrostatic means or magnetic means so that the microradios with contacts on either end have an axis transverse to the longitudinal axis of the tines of the interdigitated structure. As an alternative to depositing the microradios utilizing a printing process involving conductive inks, in an alternative embodiment a xerography-type deposit of microradios on the interdigitated structure utilizes photoconductive materials onto which the microradios are initially dispersed.

In at least one embodiment, a Radio Frequency Identification (RFID) device includes an antenna having interdigitated fingers defining a feed region of the antenna, the interdigitated fingers having parallel centerlines and being spaced one from another, and a chip having opposing ends overlaying opposing fingers of the interdigitated fingers such that a coupling is established between the chip and the antenna at the interdigitated fingers.

In at least one example, the interdigitated fingers extend alongside each other so as to overlap over a substantial portion of a length thereof.

In at least one example, the chip has metal ends that function as electrical pads.

In at least one example, the chip has an aspect ratio which is greater than 2:1 to avoid shorting the antenna with a single pad.

In at least one example, the coupling comprises at least one of direct DC contact, inductive coupling, and capacitive coupling.

In at least one example, the interdigitated fingers comprise lines isolated from adjacent lines by one or more gaps to form an interdigitated structure at the feed region, and direct contact is established between the opposing ends of the chip and the opposing fingers.

In at least one example, the chip is positioned across one of the one or more gaps.

In at least one example, a conductive material is positioned across the other gaps.

In at least one example, the chip is self-aligned by at least one of an electrostatic free charge, electrostatic dielectric polarization, and permanent magnetism.

In at least one embodiment, a radio-frequency identification (RFID) tag includes an antenna and a radio device. The antenna has a first end defined by first tines and a second end defined by second tines separated from the first tines by a gap having a minimum gap distance. At least one of the first tines is placed between two of the second tines and at least one of the second tines is placed between two of the first tines with all portions of the first tines separated from all portions of the second tines by at least the minimum gap distance. A radio device bridges the gap to complete a circuit. The radio device has a first electrically conducting pad overlaying and electrically coupled to a particular first tine and a second electrically conducting pad overlaying and electrically coupled to a particular second tine.

In at least one example, the first electrically conducting pad and second electrically conducting pad are spaced from each other by approximately the gap distance.

In at least one example, the first electrically conducting pad and second electrically conducting pad define longitudinal ends of the radio device, the longitudinal ends defining a length insufficient to cross any three of the first and second tines.

In at least one example, the first electrically conducting pad and second electrically conducting pad define longitudinal ends of the radio device, the longitudinal ends defining a length sufficient to permit bridging of the gap only once.

In at least one example, the radio device has a rectangular shape with a longitudinal length and lateral width. The longitudinal length is sufficient to bridge the gap only once. The lateral width is less than the minimum gap distance.

In at least one example, the radio device has a rectangular shape with a longitudinal length and lateral width. The longitudinal length is at least approximately twice the lateral width.

In at least one example, the first tines and second tines are parallel, and the longitudinal length of the radio device is approximately perpendicular to the first and second tines.

In at least one example, the first electrically conducting pad and second electrically conducting pad comprise three-dimensional contact structures.

In at least one example, the first electrically conducting pad is electrically coupled to a particular first tine by at least one of: direct DC contact, inductive coupling, and capacitive coupling.

In at least one example, a conductive material is positioned in at least one portion of the gap.

BRIEF DESCRIPTION OF THE DRAWINGS

These and other features of the subject invention will be better understood in connection with the Detailed Description, in conjunction with the Drawings, of which.

DETAILED DESCRIPTION

By way of further background, RFID tags are becoming a well-established method for tracking materials during shipping and storage. In many applications they replace the printed bar code labels on items because they do not require a close proximity for the automatic reader. RFID tags that conform to the ISO/IEC 18000 standard also can contain significantly more data than a printed bar code label and can be modified en route to include waypoint or other information.

Present RFID tags cost about $US 0.50 (50 cents) and are usually fabricated by electrically bonding a custom integrated circuit (IC) to a substrate containing a printed circuit antenna. The usual fabrication method, well known in the electronics industry is flip-chip bonding. An electrically conductive solder paste is applied to the appropriate places on the antenna. A "pick and place" machine picks up the IC die and places it onto the substrate in the proper location with respect to the antenna connections. The assembly is then heated to cure the solder and mechanically bond the structure. The substrate may have an adhesive backing for eventual manual or machine application to the end item.

The common wisdom in the RFID industry as of 2005 is the cost of the tags must be less than $US 0.05 (5 cents) for the widespread adoption. Cost is the key driver for the application. With the economy of scale of integrated circuits, the cost of an individual RFID die of the required size can be very low. The cost of the antenna on the substrate can also be very low. The primary cost is the tag manufacturing process and the application of the tag to the end item.

As mentioned hereinbefore, methods for fabricating the tag such as "strap-mounting" have been proposed by Alien Technology and Avery Dennison. Self-assembly methods, such as that disclosed in U.S. Pat. No. 6,864,570 "Method and Apparatus for Fabricating Self-Assembling Microstructures" have been also been proposed for tag manufacture.

The components of a passive RFID tag are typically an antenna, and a chip containing a rectenna circuit, an energy-storage capacitor, a controller and a memory. In operation, an RF field is transmitted to the tag fro a programming device or a reader. The energy received by the tag antenna is coupled to the chip where it is rectified and transformed to a higher voltage using a voltage multiplier circuit. This energy is stored in a capacitor. When sufficient voltage has been achieved in the energy storage device, the rest of the chip is able to function.

For programming the tag, data specific to an end item is sent from the programmer to the tag and stored into memory. Query of the tag is done by a reader which functions in a similar way, except now the stored data is sent back to the reader. In applications where additional data is to be added to tag during transit, the same process used to program the tag may be used to store new information.

Figure 1:
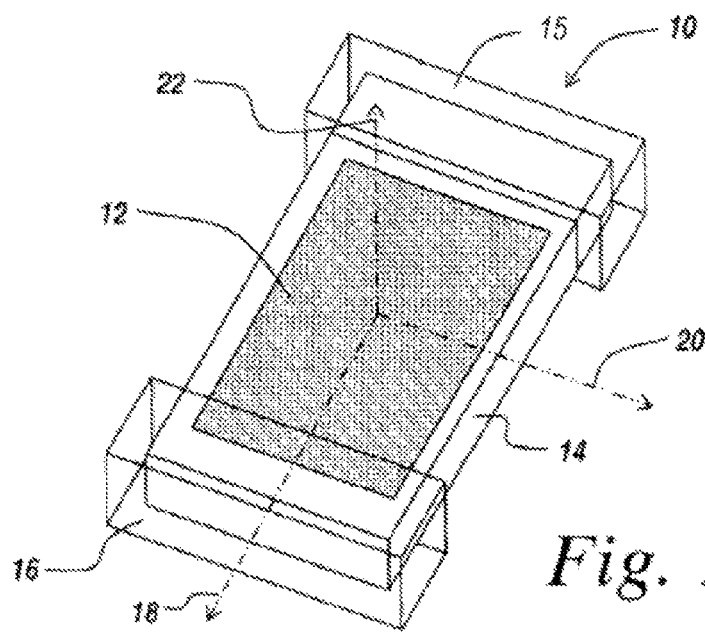
FIG. 1 is a perspective view of an RFID chip that serves as a microradio, showing, inter alia, metallized ends that function as electrical pads for the connection of the chip to the feed point of an antenna.

Referring now to FIG. 1, a microradio 10 in the form of an RFID chip is manufactured having an integrated circuit 12 located on a substrate 14 with the integrated circuit chip being connected to metallized ends 15 and 16 at opposite ends of a rectilinear chip structure. In one embodiment the ratio of length to width is 2:1 to establish proper connection to an interdigitated antenna feed structure.

It is noted that there is a longitudinal axis 18 for such a microradio chip, a lateral axis 20 and a vertical axis 22 as illustrated.

Thus in a preferred embodiment the chip has a two-to-one aspect ratio, with the metal ends manufactured as a modification of conventional chip manufacturing techniques. The chip can be mounted face-up or facedown and achieve contact with the antenna for the tag. Alternatively, a chip can be mounted in a "capsule" fabricated utilizing three-dimensional etch techniques. The capsule would then have large metal caps on the ends to provide the pads.

In one embodiment the RFID chip is composed of several sublayers of integrated circuit materials and conductive materials, not shown in this figure. The insulating layer is normally applied over the chip area except for the metal pad regions. It is noted that the smaller the RFID chip that can be fabricated, the more chips that can be manufactured on a single wafer and the lower the part cost for each chip.

It is noted that the structure in FIG. 1 is a three-dimensional contact structure in which the contact pads are not on a single XY plane but also have contact material in the Z direction with respect to the chip. As will be seen, the purpose of this when these microradios are deposited over an antenna feed is that they can make electrical contact to the antenna feed, sometimes regardless of the orientation of the microradio to the antenna feed. For instance, it is not necessary to have the microradio have its contacts on a single plane, which must be then married to the contact pads of the feed of the antenna.

Rather, the attachment of randomly oriented microradios can be established in accordance with the technique described in a patent application entitled "RFID Tag and Method and Apparatus For Manufacturing Same" by Ken Erickson and assigned to the assignee hereof and incorporated herein by reference. In this patent application, randomly oriented microradios can be attached to an antenna feed by having one end of the microradio be attached to one feed point and an insulating layer placed on top of it followed by a conductive printed layer to attach the other end of the microradio to the other feed point of the antenna.

This technique is described in Provisional Patent Application Ser. No. 60/711,217 filed Aug. 25, 2005.

The following describes a number of methods for coupling an RFID chip microradio to an antenna.

Figure 2:
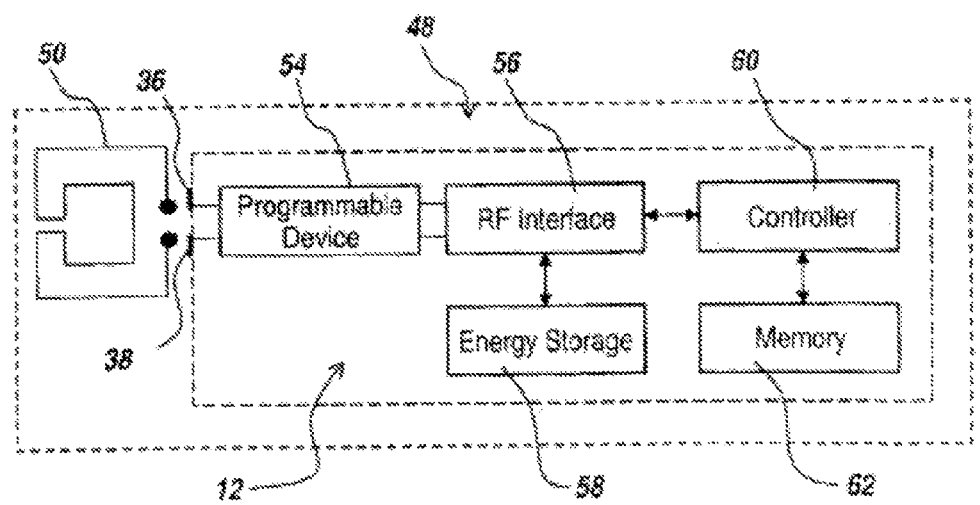
FIG. 2 is a block diagram of an RFID chip microradio and its connection to a dipole antenna through the connection of the RFID chip metallized pads to the feed point of the antenna.

However, prior to describing the coupling of the RFID chip microradio to an antenna, and referring now to FIG. 2, an RFID tag 48 includes inter alia an antenna 50 designed according to well-known principles. This antenna is responsive to RF energy in the chosen frequency band for the tag. As described below, this antenna is fabricated utilizing electrically conductive ink in one embodiment or any type of metallizing structure on an item to be tagged.

An integrated circuit microradio with conductive surfaces 36 and 38 contains a programmable device 54 together with an RF interface 56. Also included are an energy storage device 58, a controller 60 and a memory 62. The functions of the RF interface, energy storage, controller and memory are typical of passive RFID tags to provide the performance described hereinbefore.

Here it can be seen that it is important to be able to connect the RFID chip 10 to antenna 50 by virtue of the direct DC contact of pads 36 and 38 to feed points and of antenna 50.

Method One: Interdigitative Feed

Figure 3:
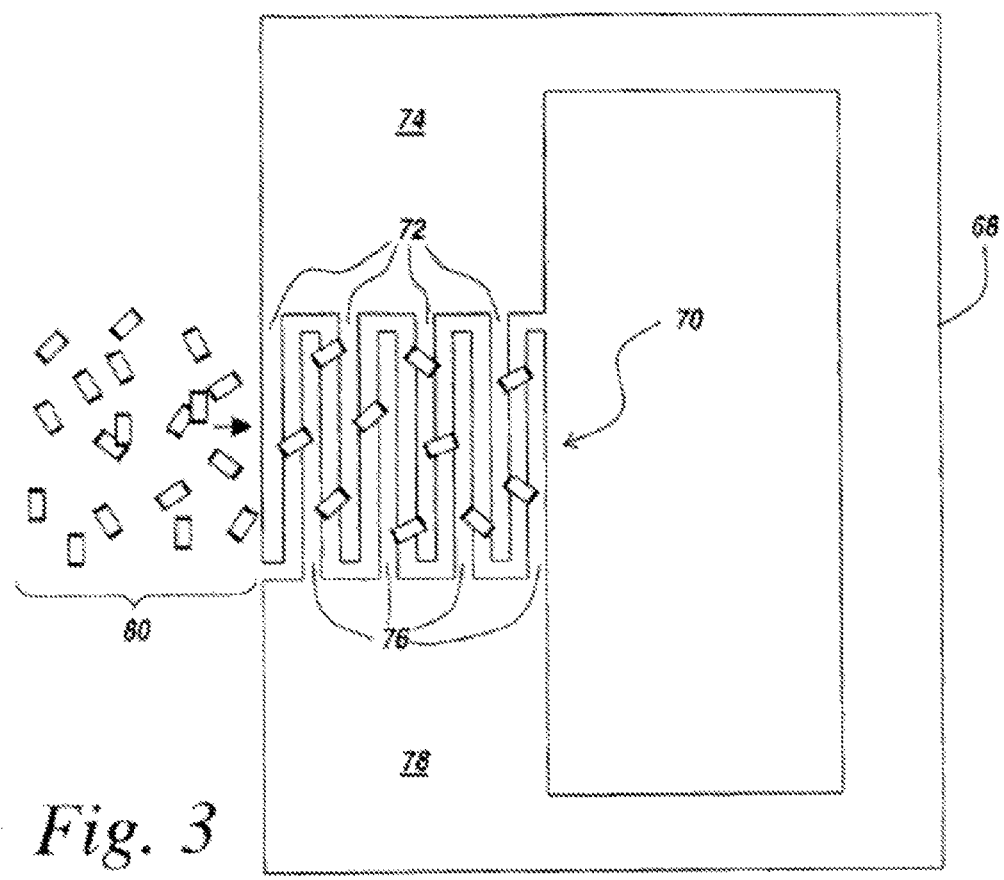
FIG. 3 is a diagrammatic illustration of an interdigitated feed for a loop antenna, illustrating the deposit of large numbers of microradios, some of which will be properly positioned across adjacent interdigitated tines or fingers so as to be connected to the antenna.

As part of the subject invention and referring to FIG. 3, an antenna 68, which is in this case a loop antenna, is provided with an interdigitated feed 70 that contains a series of tines 72 connected at feed point 70 to a portion 74 of antenna 68.

Likewise, interdigitated tines 76 are interdigitated between tines 72 and are electrically connected to a portion 78 of antenna 68.

Thus the feed region 70 of the antenna has a large interdigitated gap. For quick and inexpensive placement of a chip, the chip can be randomly placed on the interdigitated gap at the antenna feed, where the gap is made the same size as the separation between the two pads on the chip. Chip dimensions should be minimized for economy of manufacture, with the chip dimensions also being determined by RF components and pad dimensions. The 2:1 aspect ratio of the chip allows only those chips that are correctly placed to make contact with the antenna by bridging the gap between the interdigitated tines or fingers.

In general, the chip should be long enough to cross the two disconnected adjacent tines. However, they should not be so long as to cross three tines because the chip could potentially make contact with two tines on the same side of the antenna feed, and the chip will be ineffective. The dimensions of the interdigitated tines can be optimized for the dimensions of the chip, or the chip can be optimized for the dimensions of the tines. In either case, there should be approximately equal spacing for the tines and for the pads on the chip. The pad structure on the chip can be narrower with a high aspect ratio, or triangular, to maximize probability of contact. Each individual pad should not be large enough to cause shorting across the gap.

Here microradios 80 are randomly deposited over the tines of the interdigitated feed so that at least one chip will be properly aligned across the gap between the tines, thereby establishing a direct DC connection of the microradio across the tines of the feed point of the antenna.

The chips can be painted on, blown on or dispensed similar to inkjet printing. The last method is disclosed in the referenced patent entitled "RFID Tag and Method and Apparatus For Manufacturing Same." As will be seen, this method is probabilistic. This means that it is highly probable given a large number of microradios dispensed on the interdigitated structure that at least one microradio will be properly positioned across the adjacent tines of the interdigitated feed structure.

To determine correct placement and orientation of the RFID chip onto the antenna, the RFID response can be tested utilizing standards RFID functionality. If incorrect placement, another chip may be added until success is achieved. For electrical contact, either the pads require electrically conductive adhesive, or the antenna interdigitated feed structure must have conductive adhesive thereon.

This method does not require precise orientation and positioning of the chip on the feed region if one or more chips are used. As will be described hereinafter, magnetostatic, electrostatic or photoconductive orientation methods may be used to ensure orientation and positioning of the chips.

Figure 4:
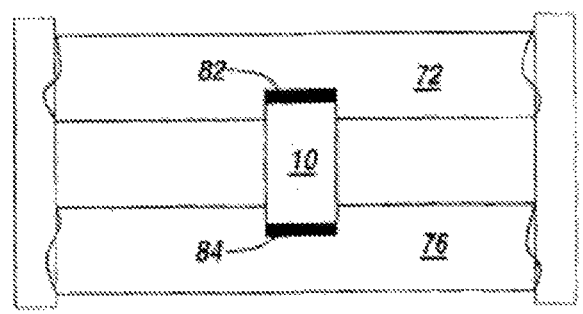
FIG. 4 is a diagrammatic illustration of a microradio of FIG. 3 properly connected across adjacent tines or fingers of an interdigitated feed point for an antenna.

Referring to FIG. 4, what is seen is the proper orientation of chip 10 across adjacent tines 72 and 76, with conductive ends 82 and 84 directly attached to the opposed tines.

Figure 5:
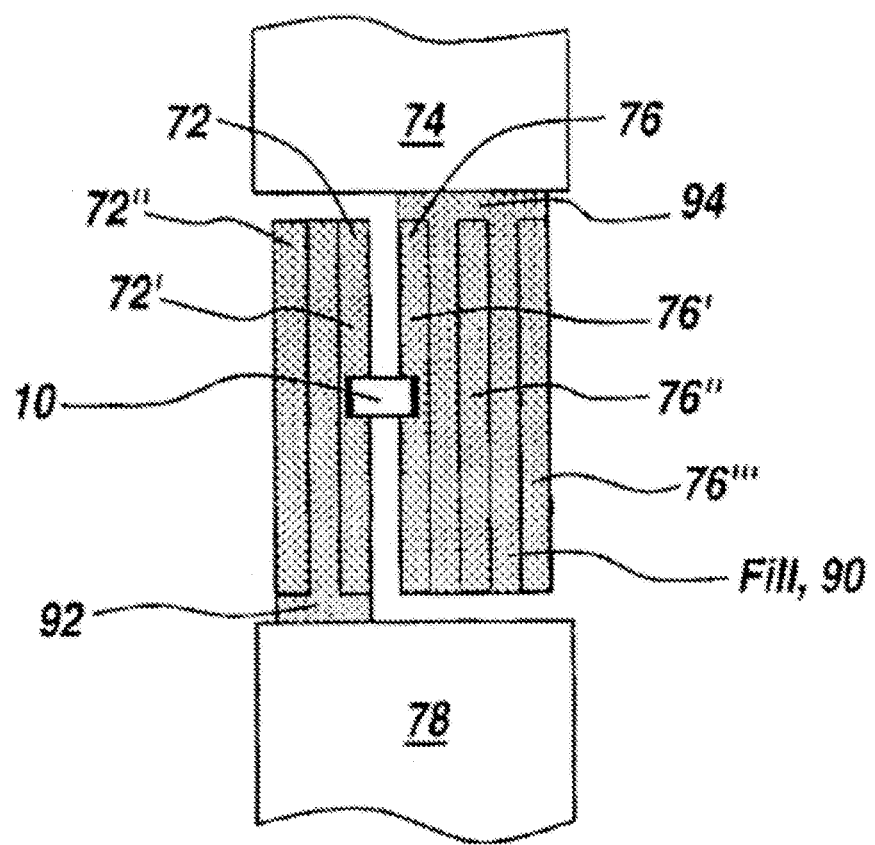
FIG. 5 is a diagrammatic illustration of an interdigitated feed printed by conductive ink on a substrate showing a microradio bridging adjacent interdigitated tines or fingers, showing the use of conductive fill to either side of the fingers or tines to which the microradio is attached, thereby to add conductivity in excess of that associated with conductive ink to eliminate the effects of the resistivity of the conductive ink.

Prior to discussing the ability to orient microradios dispersed over an interdigitated antenna feed structure, if the antenna is printed utilizing conductive inks, and if as shown in FIG. 5 microradio 10 bridges opposed tines 72 and 76, the connection to antenna regions 74 and 78 can be more robustly established by filling in the adjacent interdigitated tines with a conductive fill 90 such that, for instance, tine 72' is robustly connected to adjacent tine 72", whereas tine 76' is robustly connected to adjacent tines 76" and 76'". It is noted that the conductive fill not only covers the adjacent tines for which a gap is not needed, area 92 connects all of the tines associated with it to area 78 at the antenna feed, whereas conductive fill at 94 attaches the associated tines to region 74.

In this manner, assuming that one can have a single microradio across the interdigitated tine structure and assuming that the interdigitated tine structure as well as the antenna is made of conductive ink that may have a non-optimal resistivity, the resistivity between the ends of microradio 10 and the associated tines and consequently the associated portions of the antenna at the feed can be made more robust by the filling of the interdigitated tines as illustrated.

This constitutes a parallel grid feed, which is another implementation of the interdigitated feed gap that is utilized to avoid losses due to thin fingers and non-optimal conductivity of the thin fingers themselves.

The gap is composed of parallel conductive lines that are isolated from each other by a gap. The RFID chip is dispensed onto the parallel grid and contact is made across two of the lines or fingers or tines. The extra gaps between other parallel lines are filled in with conductive material and the final result is a single, very small feed gap, with the RFID chip robustly coupled to the antenna. The advantage of this method is less conductor loss at the feed.

Note that if the antenna is created utilizing inkjet printing, then the chip can be deposited before the ink has stabilized. Any gaps can be filled in by smearing the other parallel tines with conductive material or by adding conductive in with the inkjet dispenser.

Self-Positioning

As mentioned in connection with FIG. 3, the interdigitated structure is useful for providing more contact points or areas when multiple chips are deposited across the antenna feed. However, the random positioning of these microradios does not provide for the most robust signal connections into and out of the chip.

Figure 6:
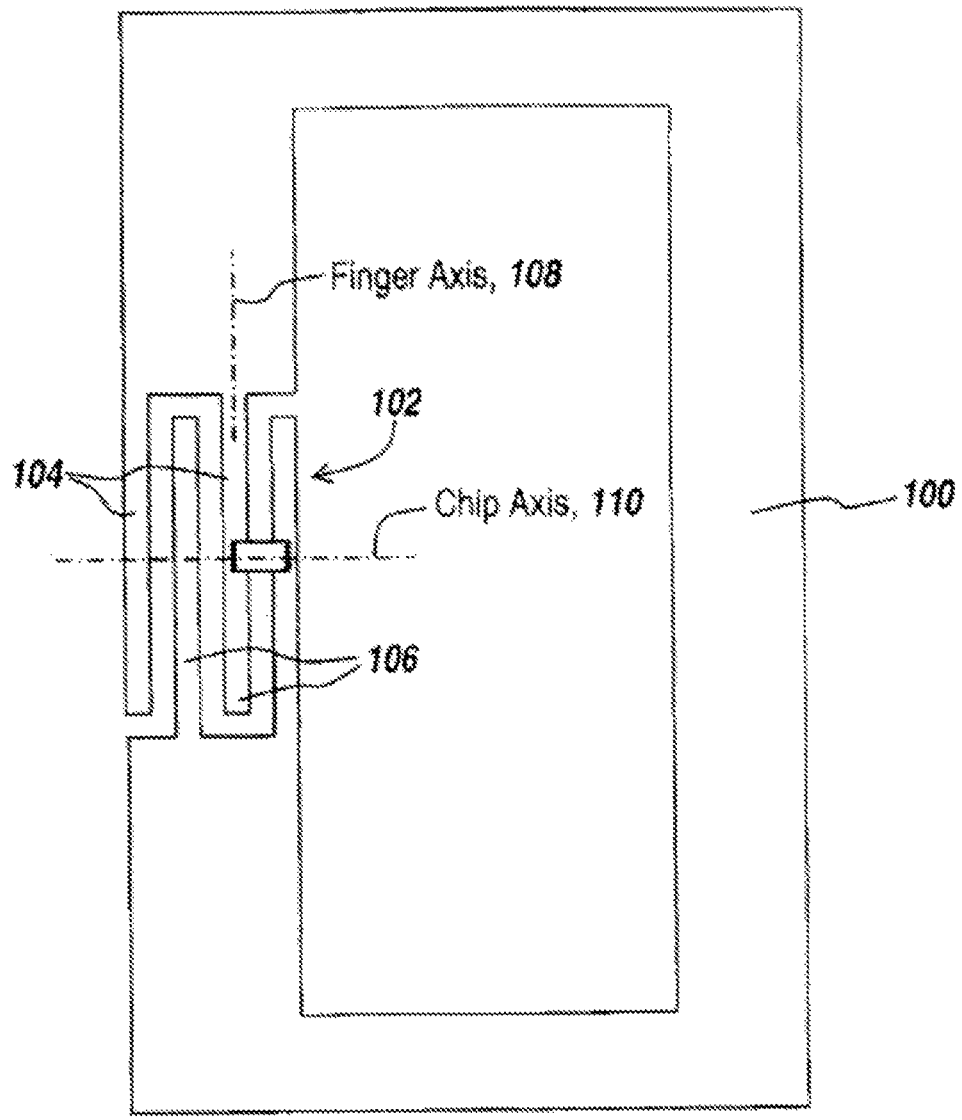
FIG. 6 is a diagrammatic illustration of the proper location of a microradio RFID chip having a chip axis that is orthogonal to the tine or finger axis, with such alignment being optimal for the connection of the microradio to the interdigitated feed structure of the antenna.

Referring now to FIG. 6, an antenna 100 with an interdigitated feed zone 102 has fingers 104 and 106 that lie essentially along a finger axis 108 as illustrated.

For most robust coupling of the microradios to the antenna feed structure, the chip axis 110 is to be perpendicular to the finger axis 108. How this is accomplished in various embodiments is now described.

Figure 7:
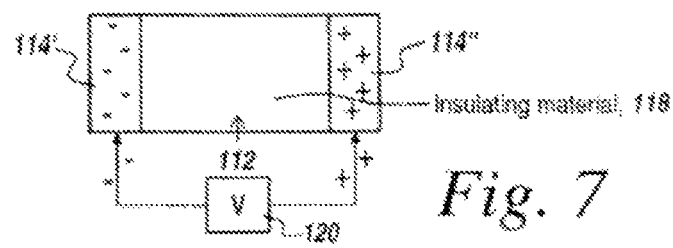
FIG. 7 is a diagrammatic illustration of the electrostatic free charge that can be provided for the RFID chip in which a potential is applied across the electric pads of the RFID chip, with the RFID chip having insulating material between the pads, whereby the microradio is given a differential charge across the chip.

Referring to FIG. 7, in an electrostatic free charge embodiment, an RFID chip microradio 112 with conductive ends 114 and 116 is fabricated with an insulating material 118 between the two ends.

An electrostatic free charge is generated by applying a voltage 120 with the negative terminal applied to conductive pad 114' and with the positive side coupled to conductive pad 114".

As can be seen, negative charges flow into pad 114', whereas holes [holes/wholes?] or positive charges flow out of pad 114" whereby the microradio is provided with electrostatic charge different at opposite ends.

Figure 8:
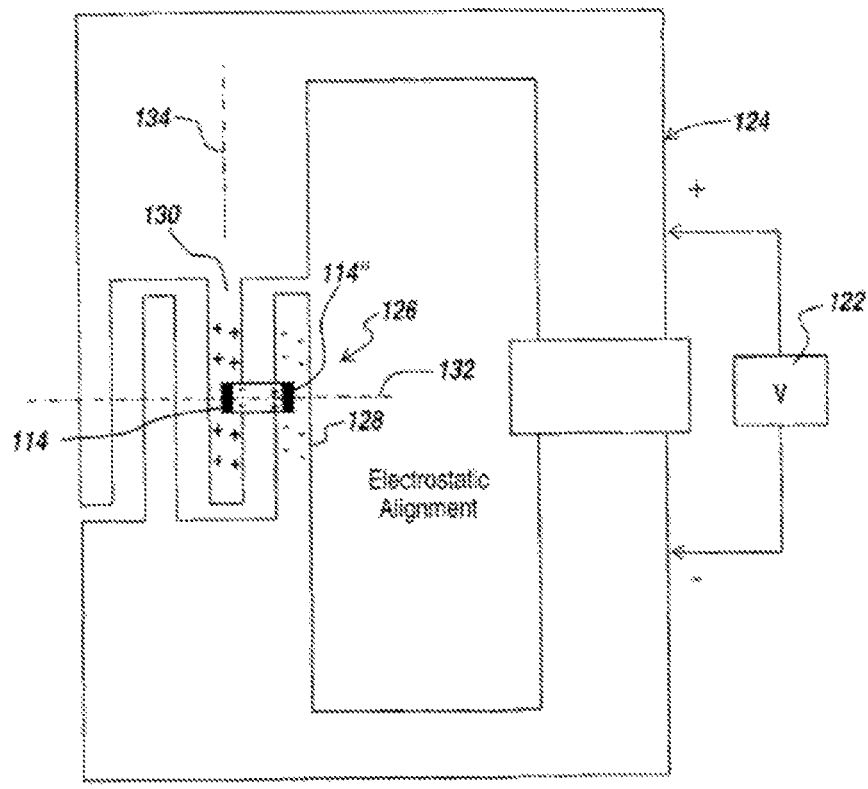
FIG. 8 is a diagrammatic illustration of one method of aligning the microradio of FIG. 7 by virtue of the fact of the electrostatic free charge orienting a microradio deposited across the tines of the interdigitated antenna feed, illustrating the application of a voltage across the dipole so as to provide an attractive force for the portions of the microradio having opposite polarity charge thereon.

Referring to FIG. 8, if a voltage as illustrated at 122 is applied for instance across the dipole antenna 124 having an interdigitated feed region 126, then as can be seen, finger or tine 128 of feed 126 has negative charges on it, whereas tine 130 has positive charges on it.

If the microradio 112 of FIG. 7 happens to land approximately with its longitudinal axis 132 perpendicular to the longitudinal axis 134 of the tines, then the negative charges will attract the positive charges on end 114", whereas the positive holes will attract the negative charges 114' so as to align a microradio transverse to the longitudinal axis of the fingers.

Figure 9:
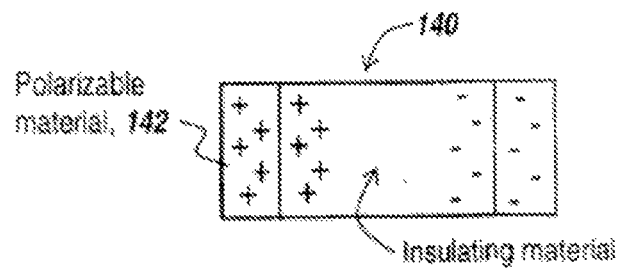
FIG. 9 is a schematic diagram of a microradio that incorporates polarizable material such as tantalum oxide or any other high-dielectric material as a substrate for the integrated circuit. When a polarizable material is used, the external aligning E fields can also be the resonant RF field of the antenna.

This self-alignment technique is mimicked in FIG. 9, where the microradio itself, here illustrated at 140, is provided with polarizable material 142 that has a high dielectric constant. Such a material is tantalum oxide.

Figure 10:
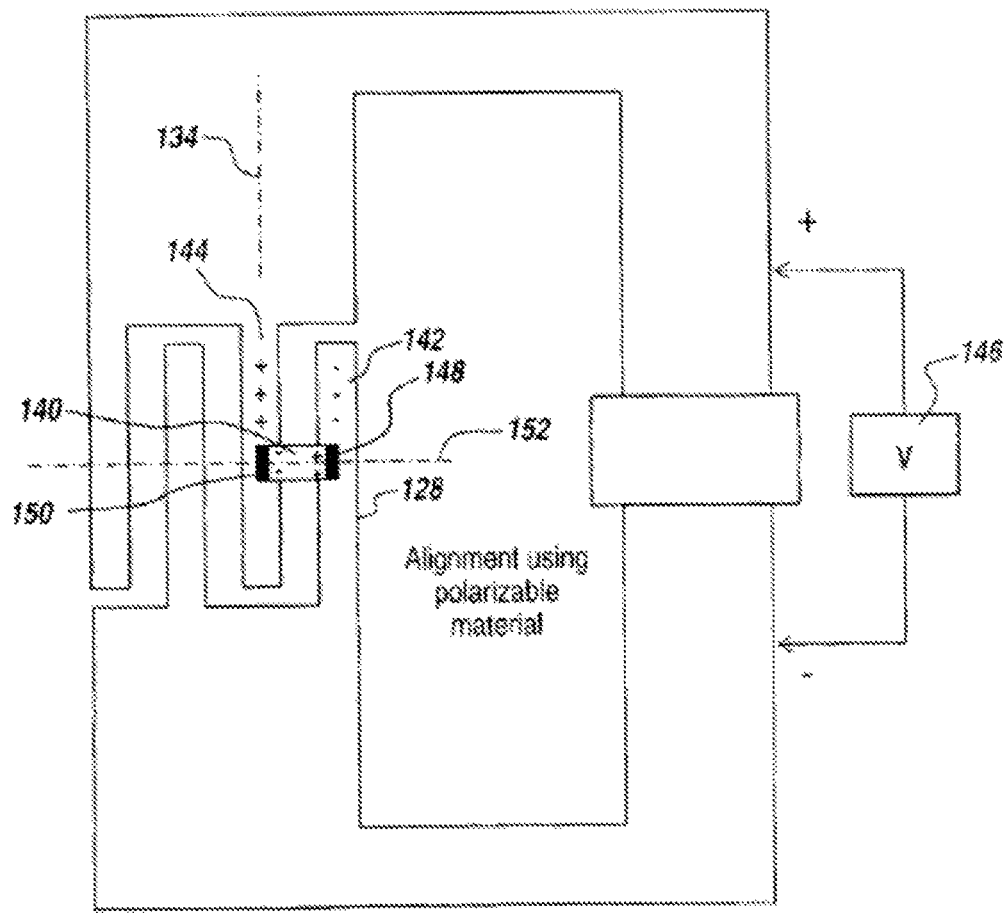
FIG. 10 is a diagrammatic illustration of the alignment of the microradio of FIG. 9 through the application of a differential voltage across the tines of the interdigitated feed for the antenna in which not only does the applied voltage polarize the material but further assists in the alignment of the polarized microradio after polarization.

If, as illustrated in FIG. 10, microradio 140 is deposited over tines 142 and 144 and assuming a voltage 146 is applied as illustrated, then there will be a negative charge on tine 142, which will cause a migration of holes in the polarizable material to migrate to an end 148 of microradio 140.

Likewise holes at tine 144 will cause negative particles to migrate towards end 150 of microradio 140. The result is a self-alignment of microradio 140 along transverse axis 152 likewise perpendicular to the longitudinal axis of tines 142 and 144.

Figure 11:
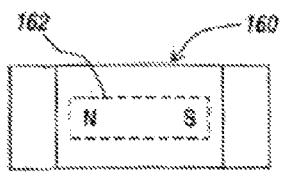
FIG. 11 is a diagrammatic illustration of the utilization of a small magnet running along the longitudinal axis of the radio, indication north and south poles thereof.

As illustrated in FIG. 11, a microradio 160 may be provided with an internal magnet 162 having the indicated north and south ends.

Figure 12:
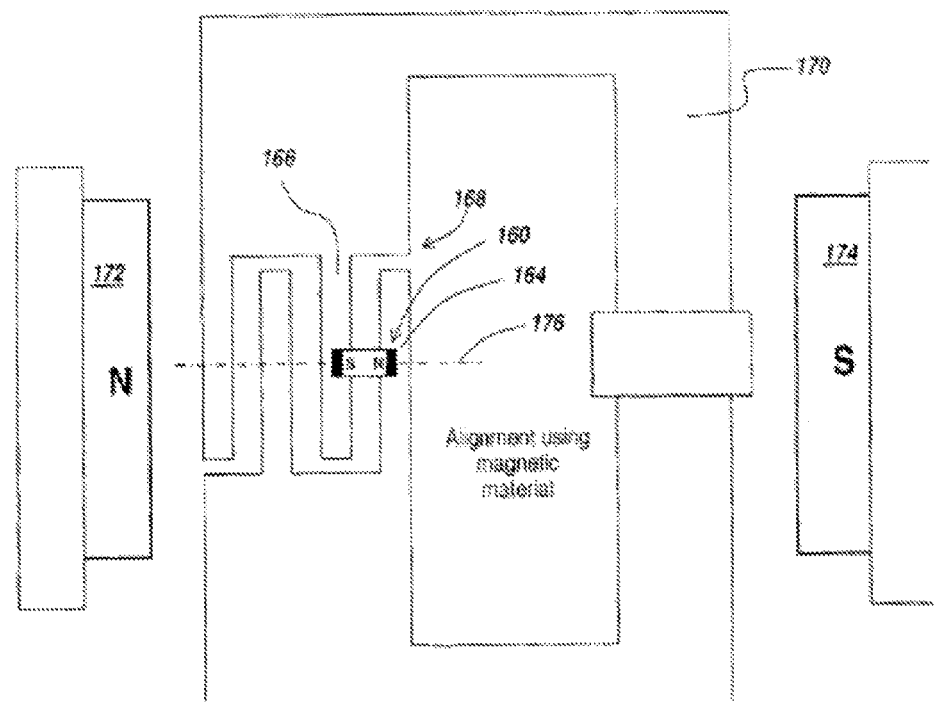
FIG. 12 is a diagrammatic illustration of the alignment of the microradio of FIG. 11 through the utilization of a permanent magnet having north and south poles that attract the corresponding south and north poles of the microradio, thereby to align the microradio across the tines of the interdigitated antenna feed.

As illustrated in FIG. 12, when this microradio 160 is deposited over the tines 164 and 166 constituting the feed point 168 of antenna 170, with the application of an external magnetic field as shown by magnet pole pieces 172 and 174, then the magnetic field provided by these pole pieces attracts the opposite north-south ends of internal magnet 162, thus to align microradio 160 along transverse axis 176.

Figure 13:
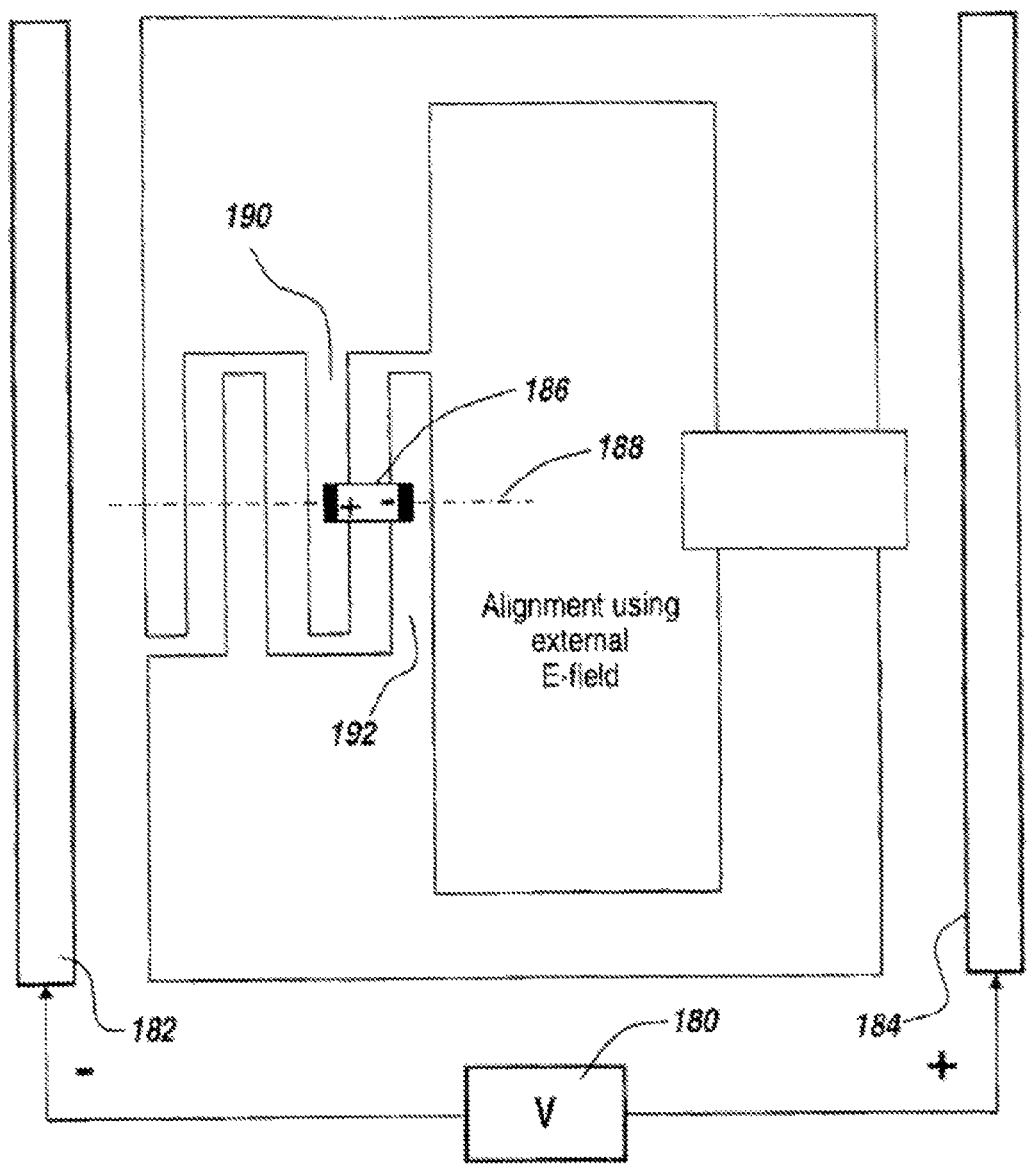
FIG. 13 is a diagrammatic illustration of the utilization of an external E-field to align a polarized microradio so that its axis lies transverse to the longitudinal axis of the tines of an interdigitated antenna feed.

Referring now to FIG. 13, if a voltage 180 is applied across conductive plates 182 and 184, alignment of a polarized or electrostatically free charge microradio 186 will cause the microradio 186 to align along the transverse axis 188, which is transverse to the longitudinal axis of tines 190 and 192.

The result of all of these self-alignments is that the contact pads for the microradios can be appropriately positioned across adjacent tines and in a self-aligning procedure to give the highest probability of success for at least one microradio to be properly connected across adjacent tines in the feed region of the associated antenna.

In summary, the orientation and positioning methods mentioned above include:
1) Electrostatic Free Charge: A charge is placed on the pads during or before the dispensing process, using various methods such as corona discharge. Hence an electrostatic dipole moment exists on the RFID chip. A static voltage is placed across the antenna feed gap using electrical contacts to the antenna. The RFID chip moves toward the gap and aligns itself across the gap. This is the state of minimum energy.
2) Electrostatic Dielectric Polarization: An isotropic dielectric material will polarize in the direction of an external E field. If the chip is longer in one dimension, the material will have the largest electrostatic polarization and lowest energy when the long dimension is oriented across the gap. Hence the RFID chip moves toward the gap and aligns itself across the gap.
3) Magneto-static permanent and soft magnetism: If the antenna has soft magnetic material embedded in the metal, then this material can attract magnetic flux across the gap. If the RFID chip contains a material with either permanent or induced magnetization, then the chip will move toward the gap and align itself across the gap.

Field Coupling, No DC Contact

Figure 14:
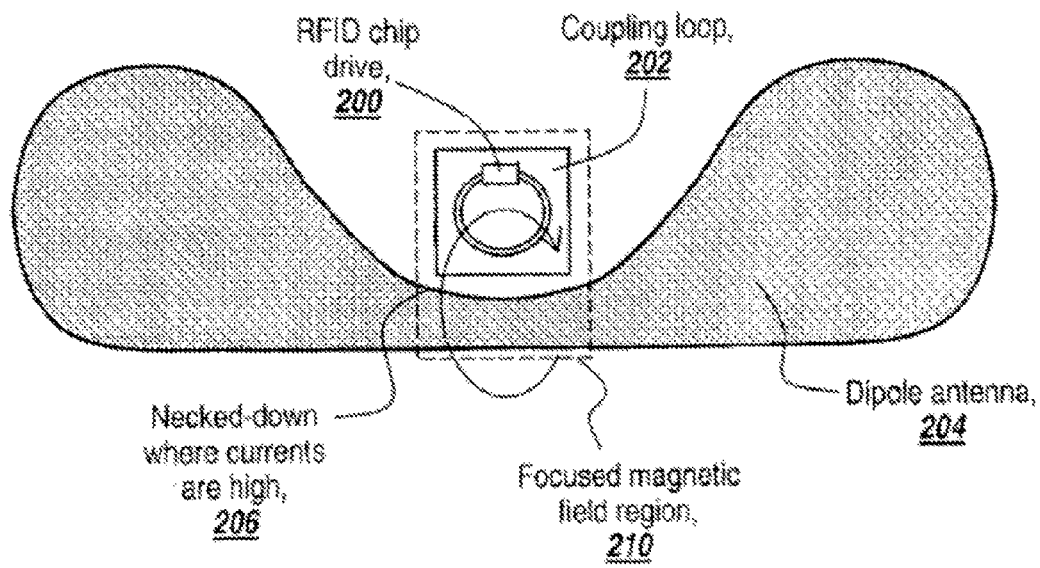
FIG. 14 is a diagrammatic illustration of an antenna feed point that has a neck-down portion where currents are high and the utilization of an RFID chip having an integral coupling loop antenna illustrating the application of a magnetic field at the neck-down portion of the antenna feed point, with the neck-down portion providing a focus magnetic field region to more efficiently couple RF energy into and out of the RFID chip and antenna from the external antenna, thereby to achieve RF coupling between the two.

As illustrated in FIG. 14, it is possible to couple an RFID chip 200 and an integral coupling loop 202 to the feed point of an antenna 204, here shown as a dipole.

The feed should be at the center of the dipole and in this case the dipole has a neck-down portion 206 where currents are high.

Field coupling is used to couple the RFID chip to the antenna, removing the DC contact failure mode. In one embodiment, the chip is dc mounted onto an intermediate-sized loop (diameter~1/20 wavelength), for enhanced bandwidth (~10%), and this loop/chip assembly is mounted as one unit onto the antenna. A very small coupling loop (diameter~1/100 wavelength), on the scale of the chip, integrated into the chip, has bandwidth limitations (~% 3%).

Because of the neck-down portion of the antenna feed, there is a focused magnetic field region 210 that is relatively small to permit small coupling loops to efficiently couple the RFID chip to its associated antenna. Thus, passive field coupling is possible. Coupling is enhanced if a dipole is made with a very thin metal region in the middle. This permits a small coil to be located in this thin region that will couple to the dipole utilizing magnetic fields. The field coupling method has the advantage that the DC contact is not a failure mode and this field coupling method is easier and cheaper when trying to couple an RFID chip to its associated antenna. In one embodiment, the field coupling loop is integrated into the RFID chip and results in a coupling, albeit narrower in bandwidth than direct coupling.

Figure 15:
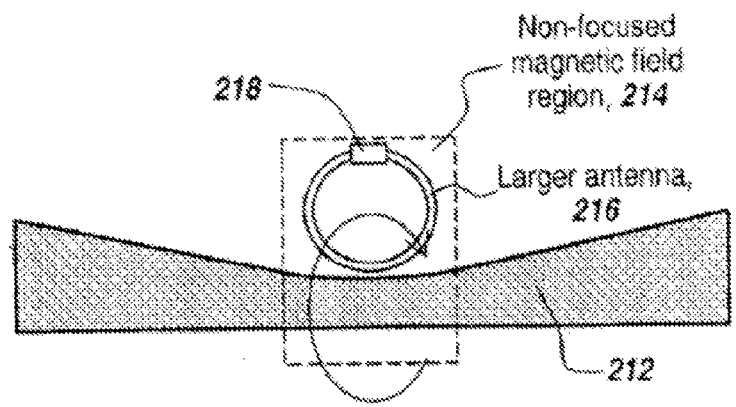
FIG. 15 is a diagrammatic illustration of a feed point of an antenna in which there is no significant neck-down portion, which results in a non-focused magnetic field region of a large extent and requires that the RFID chip be connected to a much larger antenna/coupling loop, in an intermediate process, so as to efficiently couple the output of the RFID tag to the antenna and vice versa in an efficient manner, the RFID chip being mounted onto the coupling loop in an intermediate process, which may be more reliable and controlled in some instances, than mounting the chip directly onto the inventory item.

Of course field coupling is also possible as illustrated in FIG. 15 in which a feed portion of the antenna 212 is not noticeably neck-down. This results in a non-focused magnetic field region 214 as illustrated by the dotted line.

In this embodiment, field coupling is possible by utilizing a larger antenna loop 216 coupled to the RFID tag chip 218.

As an alternative, field coupling may be accomplished through the use of a capacitive coupling in which a capacitor plate coupled to the microradio capacitively couples the output of the RFID chip to the interdigitated antenna feed point.

Photocopying Technology

Figure 16:
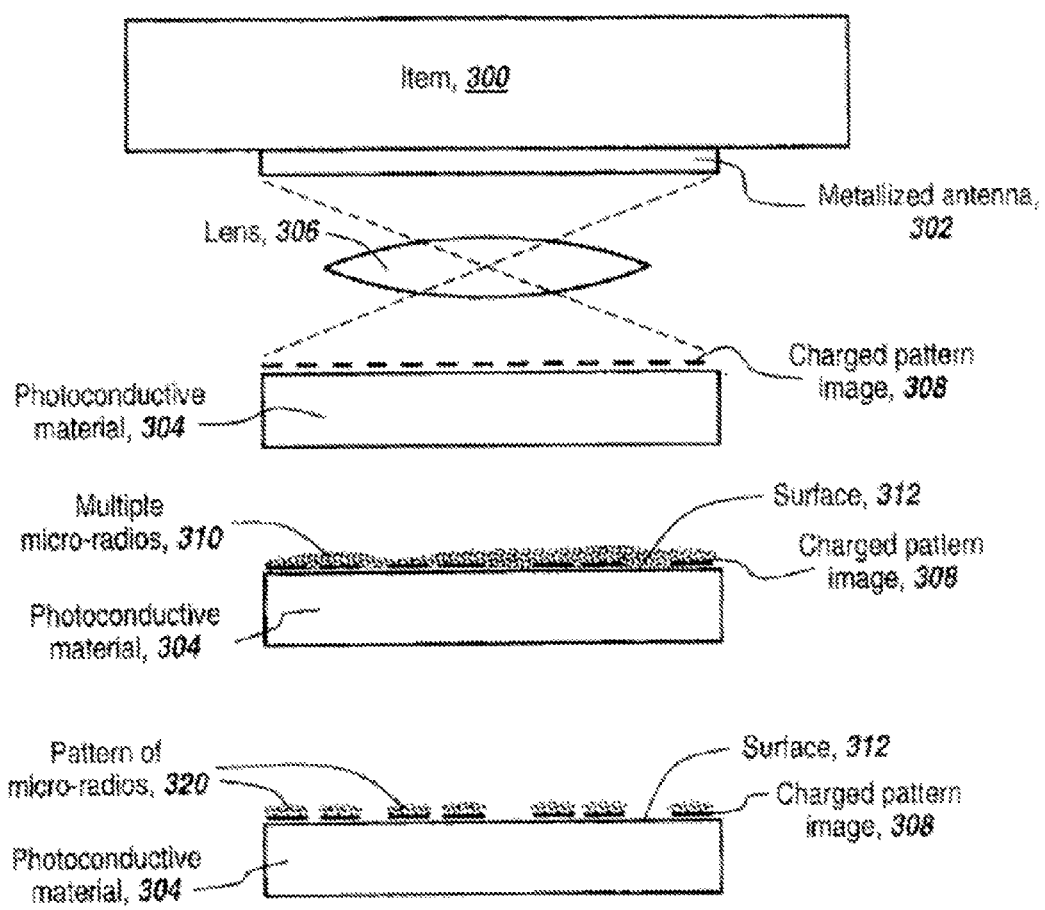
FIG. 16 is a diagrammatic illustration of an alternative to the utilization of inkjet printing utilizing a conductive ink in which a xerography-type printing is utilized in which a photoconductive material has an image of a metallized antenna focused on its surface, after which multiple microradios are distributed across the exposed photoconductor, with microradios sticking where the image is not discharged corresponding to the metallized antenna pattern, followed by the step of aligning the photoconductive material substrate with the appropriately patterned microradios against the metallized antenna where the alignment of the substrate and pattern with the antenna causes the microradios carried by the photoconductive material substrate to adhere to the metallized antenna at the appropriate feed portions thereof; and, FIG. 17 is a diagrammatic illustration of a capacitive coupling technique for coupling an RFID chip to an antenna.

Referring to FIG. 16, there is an alternative method of positioning and applying microradios to the feed points of an antenna. As can be seen in this figure, an item 300 is provided with a metallized antenna 302 on the item itself. This may be by providing a conductive ink pattern or by fabricating a metallized structure and adhering it to item 300. In this method a xerography printing system is employed that includes imaging of the metallized antenna onto a photoconductive material 304 through the utilization of a lens 306. This provides a charge pattern image on the surface of the photoconductive material as illustrated at 308.

Thereafter, multiple microradios 310 are deposited over the surface 312 of the photoconductive material 304 in which the photoconductive material has a charge pattern image.

It is a feature of the photoconductive material that it is discharged when light impinges on the photoconductive material. When the photoconductive material is discharged at various pattern places, it is noted that the microradios 310 only stick to the photoconductive material 304 where the photoconductive material is not discharged.

This leaves a pattern of microradios on the surface 320 of the photoconductive material.

When this photoconductive material is aligned with the metallized antenna 302 and, for instance, pressed into place, the microradios will be deposited at the appropriate places on the metallized antenna where they adhere to the particular antenna feed points.

The photocopy technique can be alternatively described as a way to mix the conductive ink and the chip onto a stamp, and then push this "stamp" against the feed region of the antenna. In general, conductive ink for the antenna is patterned onto an application surface, a "stamp". An RFID is mounted onto the feed gap and self-aligns/centers using magnetic/electric techniques listed above. Ink and chip are then pressed onto the item, and either heat or adhesive bonds the antenna/chip to the surface. The larger bulk of the antenna could be made using a foam stamp, dipped in ink, for quick application. Note that the region around the feed requires more precision than is available with the foam stamp. However, this interdigitated feed for the antenna can use this photocopy technique.

In summary it will be appreciated that the advantages of the embodiments described herein enables the application of very small RFID chips to an antenna feed region utilizing an interdigitated antenna feed. The subject invention also facilitates the use of printing of complete RFID tags at the point of application to an end item such as a container of pills or a box containing the item to be tracked.

Moreover, and as discussed above, precision handling of individual RFID chips during fabrication and application is eliminated, the result being a major cost savings.

Capacitive Coupling

Figure 17:
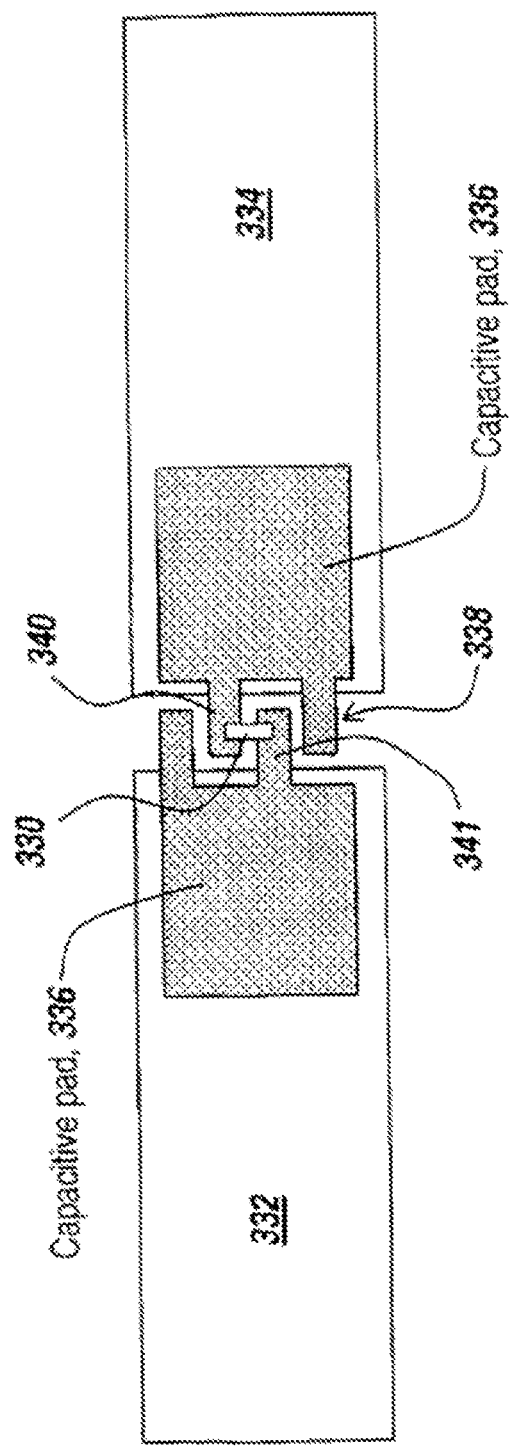

Referring now to FIG. 17, while what has been described above is field coupling utilizing a loop at the feed point of an antenna as a substitute for direct DC coupling, in FIG. 17 what is shown is a capacitive coupling of an RFID chip 330 to an antenna feed point having portions 332 and 334 overlaid by capacitive pads 336. These capacitive pads are provided with an interdigitated structure 338 such as that described above. At least one RFID chip 330 is shown connected across the interdigitated tines 340 and 341, which couples the output of the chip through the capacitive pads to the associated antenna.

Thus, rather than utilizing inductive coupling to connect the chip through the interdigitated structure to the tag antenna, one can capacitively couple the RFID chip output to the tag antenna.

Note that antenna portions 332 and 334 may be part of a standalone antenna structure or may be a conductive inkjet pattern printed on the item itself.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A Radio Frequency Identification (RFID) device comprising:
   a metallized antenna having a predetermined antenna pattern; and
   a photoconductive material having a charged pattern thereon to which at least one micro-radio is engaged therewith to form a chip, wherein the charged pattern corresponds to a pattern formed by imaging the metallized antenna and, further wherein a coupling is established between the chip and the metallized antenna to form the RFID device.

2. A method of applying microradios to feedpoints of an antenna, the method comprising:
   imaging an antenna pattern onto a photoconductive material to provide a charge pattern on the surface of the photoconductive material by discharging photoconductive material at areas of a surface of the photoconductive material impinged with light via the imaging;
   depositing a plurality of microradios over the surface of the photoconductive material, at least one of the microradios aligning and adhering to the surface of the photoconductive material according to the charge pattern; and
   applying the at least one aligned and adhered microradio to an antenna to adhere to feedpoints of the antenna.

3. The method of claim 2, wherein the microradios include RFID circuitry.

4. The method of claim 2, wherein the antenna is a metallized antenna.

5. The method of claim 2, wherein the antenna is a conductive ink pattern.

6. The method of claim 2, wherein imaging an antenna pattern includes imaging an antenna pattern through a lens.

7. The method of claim 2, wherein imaging an antenna pattern includes imaging an antenna pattern using xerography techniques.

8. The method of claim 2, wherein applying the at least one aligned and adhered microradio to an antenna includes pressing a surface of the at least one microradio against a surface of the antenna to transfer the at least one microradio to the antenna surface.

9. An RFID device having a predetermined antenna pattern to which at least one microradio is engaged thereto made according to the process of:
   imaging the predetermined antenna pattern onto a photoconductive material, wherein the antenna pattern is provided with a charge pattern on the surface of the photoconductive material when photoconductive material is discharged at areas of a surface that are impinged with light during the imaging;
   depositing a plurality of microradios over the surface of the photoconductive material such that the at least one of the microradio engages with the charge pattern; and
   applying the at least one engaged microradio to an antenna having the predetermined antenna pattern to engage with feedpoints of the antenna.

10. The device of claim 9, wherein the microradios include RFID circuitry.

11. The device of claim 9, wherein the antenna is a metallized antenna.

12. The device of claim 9, wherein the antenna is a conductive ink pattern.

13. The device of claim 9, wherein imaging an antenna pattern includes imaging an antenna pattern through a lens.

14. The device of claim 9, wherein imaging an antenna pattern includes imaging an antenna pattern using xerography techniques.

15. The device of claim 9, wherein applying the at least one engaged microradio to an antenna includes pressing a surface of the at least one microradio against a surface of the antenna to transfer the at least one microradio to the antenna surface.

16. The device of claim 9, wherein imaging the predetermined antenna pattern includes using a lens

* * * * *